(No Model.)
T. D. LINES.
COUPLING FOR VEHICLE SPRINGS.
No. 277,584. Patented May 15, 1883.
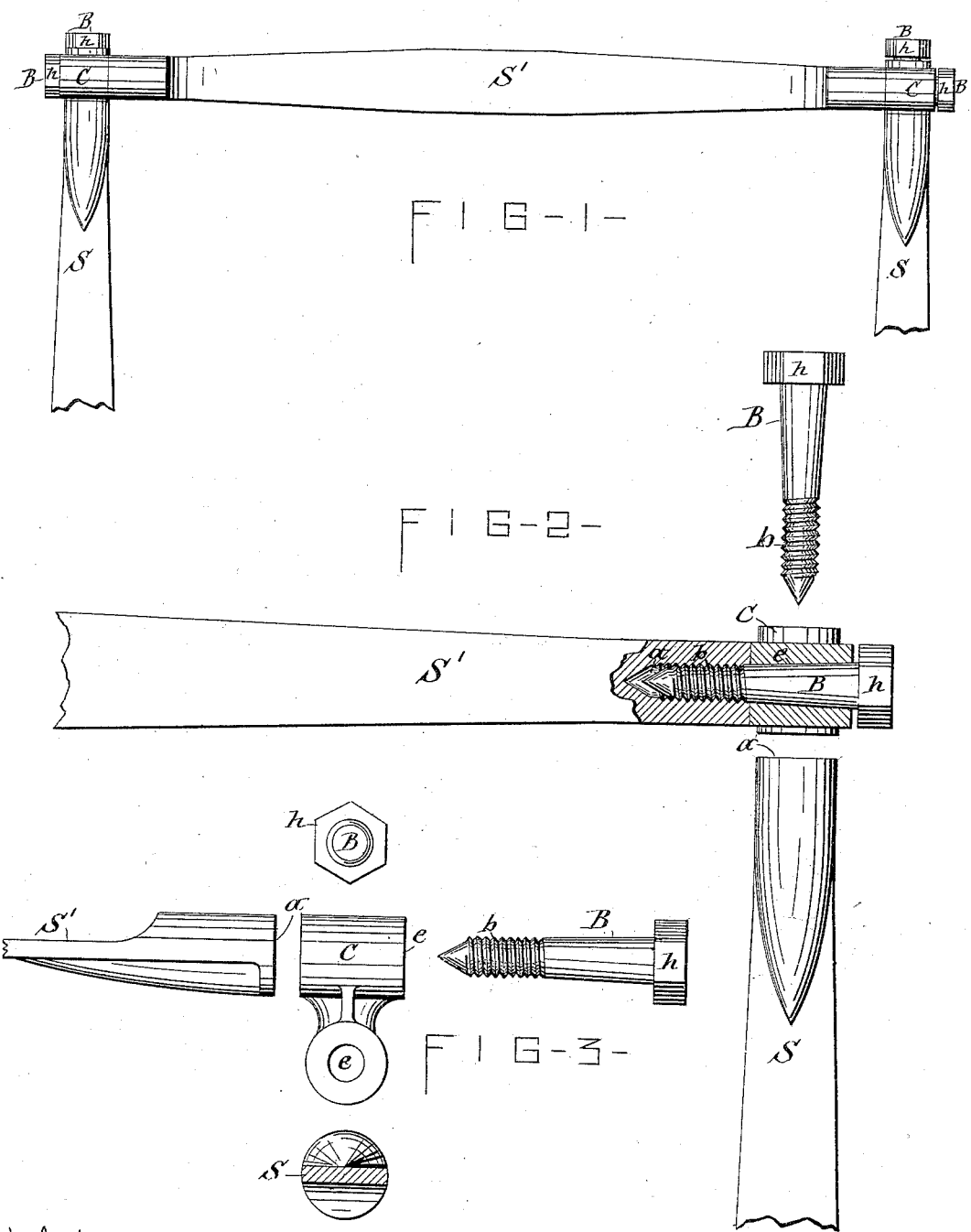

UNITED STATES PATENT OFFICE.

THOMAS D. LINES, OF SYRACUSE, NEW YORK.

COUPLING FOR VEHICLE-SPRINGS.

SPECIFICATION forming part of Letters Patent No. 277,584, dated May 15, 1883.

Application filed February 26, 1883. (No model.)

*To all whom it may concern:*

Be it known that I, THOMAS D. LINES, of Syracuse, in the county of Onondaga, in the State of New York, have invented new and useful Improvements in Couplings for Vehicle-Springs, of which the following, taken in connection with the accompanying drawings, is a full, clear, and exact description.

This invention relates to the couplings of side springs with cross-springs of a vehicle, and has special reference to that class of couplings which have two eyes or sleeves disposed at right angles in different horizontal planes, in which eyes the ends of the springs are pivoted.

The purpose of this invention is to provide improved means for connecting the springs to the aforesaid couplings, which shall admit of ready repair or renewal of the connecting device when required, and shall be capable of compensating for wear and abrasion, taking up lost motion, and preventing the rattling of the coupling.

The construction and combination of the constituent parts of my invention are as follows:

Referring to the annexed drawings, Figure 1 is a plan view of one end of a set of side and cross springs provided with my invention. Fig. 2 is an enlarged detail view illustrating the connection of the parts, and Fig. 3 is a detail view of the parts detached.

Like letters of reference denote like parts in all the figures.

S and S' represent the side springs and cross-springs, respectively, of a vehicle. These springs I provide at each end with a longitudinal screw-threaded socket, $a$, and fit said ends against the sides of the coupling C, which consists of a single casting having two sleeves or eyes, $e\ e$, arranged at right angles to each other, and in range with the sockets of the respective springs S S', and in different horizontal planes. The eyes $e$ of the coupling are conoidal or tapered toward the springs, and in the said eyes are fitted the coupling-bolts B B, which are inserted from the outer side of the coupling C, and have a smooth correspondingly-tapered body terminating with a screw-threaded end, $b$, entering the sockets $a$ of the respective springs. The tapered body of the bolt B is somewhat larger and of relatively greater diameter than the eye $e$, so that by turning the bolt B toward the spring the bolt becomes tightened in the said eye, thus affording a convenient and effective means of compensating for the wear and abrasion of said parts, and effectually preventing the rattling of the same, the bolt being provided on its outer end with a suitable head, $h$, for the application of a wrench in tightening the bolt.

Having described my invention, what I claim as new, and desire to secure by Letters Patent, is—

1. The combination, with the coupling C, having eyes $e\ e$, disposed at right angles and in different horizontal planes, of the springs S S', provided with screw-threaded sockets $a$, and the bolt B, formed with a plain body and with a screw-threaded end, $b$, as set forth and shown.

2. In combination with the springs S S', provided with screw-threaded sockets $a$, the coupling C, having tapering eyes $e\ e$, disposed at right angles and in different horizontal planes, and the bolt B, having a smooth tapering body and a screw-threaded end, $b$, substantially as described and shown.

In testimony whereof I have hereunto signed my name and affixed my seal, in the presence of two attesting witnesses, at Syracuse, in the county of Onondaga, in the State of New York, this 21st day of February, 1883.

THOMAS D. LINES. [L. S.]

Witnesses:
C. H. DUELL,
WM. C. RAYMOND.